(12) United States Patent
Murai et al.

(10) Patent No.: US 9,941,496 B2
(45) Date of Patent: Apr. 10, 2018

(54) ON-BOARD POWER SOURCE DEVICE

(71) Applicants: Toyota Jidosha Kabushiki Kaisha, Toyota-shi, Aichi-ken (JP); Kabushiki Kaisha Toyota Jidoshokki, Kariya-shi, Aichi-ken (JP)

(72) Inventors: Daisuke Murai, Toyota (JP); Ikkei Ohgitani, Obu (JP)

(73) Assignees: Toyota Jidosha Kabushiki Kaisha, Toyota-shi (JP); Kabushiki Kaisha Toyota Jidoshaokki, Kariya-shi (JP)

( * ) Notice: Subject to any disclaimer, the term of this patent is extended or adjusted under 35 U.S.C. 154(b) by 268 days.

(21) Appl. No.: 14/868,863

(22) Filed: Sep. 29, 2015

(65) Prior Publication Data

US 2016/0099451 A1    Apr. 7, 2016

(30) Foreign Application Priority Data

Oct. 1, 2014 (JP) ................................ 2014-202904

(51) Int. Cl.
*H01M 2/12* (2006.01)
*H01M 2/20* (2006.01)
*H01M 2/10* (2006.01)

(52) U.S. Cl.
CPC ....... *H01M 2/1223* (2013.01); *H01M 2/1077* (2013.01); *H01M 2/1252* (2013.01); *H01M 2/1083* (2013.01); *H01M 2/206* (2013.01); *H01M 2220/20* (2013.01)

(58) Field of Classification Search
CPC ........ H01M 2/12; H01M 2/1223; H01M 2/20; H01M 2/206
See application file for complete search history.

(56) References Cited

U.S. PATENT DOCUMENTS

| 2013/0065099 A1* | 3/2013 | Mishima | ................ B60K 1/04 429/71 |
| 2014/0127539 A1 | 5/2014 | Helber | |
| 2015/0214524 A1 | 7/2015 | Takasaki et al. | |

(Continued)

FOREIGN PATENT DOCUMENTS

| CN | 102869532 A | 1/2013 |
| CN | 103502032 A | 1/2014 |
| JP | 2011-235761 A | 11/2011 |

(Continued)

*Primary Examiner* — Karie O'Neill Apicella
(74) *Attorney, Agent, or Firm* — Dinsmore & Shohl LLP (57) ABSTRACT

An on-board power source device comprises power storage modules. In the power storage modules, a plurality of power storage elements are arranged. The power storage module is stacked one upon another. An outlet of a discharge path is provided for discharging gas generated in the respective power storage elements. A frame member extends along the end portion of the power storage modules for fixing the respective upper and lower power storage modules. A bracket locates at the end portion of the power storage modules so as to cover the outlets, for fixing the upper power storage modules to the frame member. The frame member has a discharge space for discharging the gas to the outside of the vehicle. The bracket is provide with a passage part for communicating the outlet of the upper power storage module with the discharge space of the frame member.

9 Claims, 8 Drawing Sheets

(56) References Cited

U.S. PATENT DOCUMENTS

2015/0255225 A1* 9/2015 Kusaba ............... H01M 10/625
429/120

FOREIGN PATENT DOCUMENTS

| JP | 2014-517450 A | 7/2014 | |
|---|---|---|---|
| WO | 2014/038184 A1 | 3/2014 | |
| WO | 2014083600 A1 | 6/2014 | |
| WO | WO 2014083600 A1 * | 6/2014 | .......... H01M 10/625 |

* cited by examiner

ON-BOARD POWER SOURCE DEVICE

INCORPORATION BY REFERENCE

The disclosure of Japanese Patent Application No. 2014-202904 filed on Oct. 1, 2014 including the specification, drawings and abstract is incorporated herein by reference in its entirety.

BACKGROUND OF THE INVENTION

1. Field of the Invention

The invention relates to an on-board power source device obtained by connecting a plurality of power storage modules each having a plurality of power storage elements which are electrically connected with each other.

2. Description of Related Art

The International Patent Application Publication No. 2014/083600 discloses a battery module, which is obtained by arranging a plurality of cylindrical batteries so that an end of the respective cylindrical batteries in the longitudinal direction thereof is embedded into a holder, and connecting between the cylindrical batteries with a bus bar.

An on-board power source device, for example, can be constructed by connecting a plurality of the battery modules described in the International Patent Application Publication No. 2014/083600. In this case, from a viewpoint of utilization efficiency of the on-board space, the plurality of battery modules can be arranged in a manner of stacking one upon another.

On the other hand, the cylindrical battery is provided with a discharge valve for discharging gas, which is generated internally due to abnormal of the battery, to the outside of the battery, and the battery module is provided with an outlet for the gas discharged from the discharge valve.

SUMMARY OF THE INVENTION

To discharge the gas generated inside the battery module to the outside of the vehicle, it is necessary to connect discharge pipes communicated with the outside of the vehicle to the respective outlets of the plurality of battery modules. Therefore, the number of parts will be increased, and it will also add a work for connecting a plurality of discharge pipes to the respective outlets. In addition, in order to discharge the gas flowing in the respective discharge pipes to the outside of the vehicle while guaranteeing the space for arranging the plurality of discharge pipes, it is necessary to merge the discharge pipes into one.

Therefore, an object of the invention is to provide an on-board power source device having a plurality of power storage modules consisting of a plurality of power storage elements by stacking the power storage modules one upon another, which is capable of reducing the number of parts and improving the utilization efficiency of the space in the discharge construction for gas discharged from the respective power storage modules, while appropriately discharging the gas to the outside of the vehicle.

According to the on-board power source device of one aspect of the invention, power storage modules are stacked one upon another in a predetermined direction, the power storage module being a module in which a plurality of power storage elements extends in the predetermined direction are arranged in a plane orthogonal to the predetermined direction. The power storage module has a discharge path for discharging gas generated in the power storage elements and discharged from a discharge valve, which is provided at an end side of the respective power storage elements in the predetermined direction, to the outside of the power storage module, and an outlet of the discharge path provided at an end portion of the power storage module in an arrangement direction of the plurality of power storage elements. The on-board power source device includes a frame member that extends along the end portion of upper and lower power storage modules at which the respective outlets are arranged and that fixes the upper and lower power storage modules, and a bracket that is located at the end portion so as to cover the outlets and that fixes the upper power storage module to the frame member. The frame member has its interior formed to be hollowed as a discharge space for discharge the gas to the outside of vehicle, and the bracket includes a passage part for communicating the outlet of the upper power storage module with the discharge space of the frame member.

According to the above aspect, since the bracket for fixing the upper one of the power storage modules stacked one upon the other to the frame member is provided with the passage part for communicating the outlet for discharging the gas from the upper power storage module with the hollow space (discharge space for discharging the gas to the outside of the vehicle) of the frame member, it is unnecessary to separately provide a discharge pipe or the like for the upper one of the stacked power storage modules; furthermore, since the hollow space of the frame member for fixing the power storage modules via the bracket is used to discharge the gas to the outside of the vehicle, it is unnecessary to separately connect the outlet to the outside of the vehicle with respect to the fixing structure of the power storage modules. Therefore, it is possible to achieve the reduction of the number of the parts and improve the utilization efficiency of the space in the discharge construction for the gas.

In the above on-board power source device, the construction may be such that the upper and lower power storage modules stacked one upon the other are fixed to the frame member via the bracket. In this time, the passage part may be constructed so that it extends from the outlet of the upper power storage module downwardly towards the frame member via the outlet of the lower power storage module, and may include a first communication portion communicating with the outlet of the upper power storage module and a second communication portion communicating with the outlet of the lower power storage module. Furthermore, the construction may be such that an end of the passage part lower than the second communication portion is connected to a communication hole of the discharge space formed in the frame member. With such a construction, it is unnecessary to provide a separate discharge pipe or the like for the respective outlets of the respective power storage modules stacked one upon another, and since the hollow space of the frame member for fixing the power storage modules via the bracket is used to discharge the gas to the outside of the vehicle, it is possible to merge the gas discharged from the upper and lower power storage modules into the frame member and discharge the same to the outside of the vehicle, and it is unnecessary to separately connect the outlets to the outside of the vehicle with respect to the fixing structure of the power storage modules. Therefore, it is possible to reduce the number of the parts and improve utilization efficiency of the space in the discharge construction for the gas.

In the above on-board power source device, the construction may be such that one end of the passage part is connected to the outlet of the upper power storage module, and the other end of the passage part is connected to a first communication hole of the discharge space formed in a top face of the frame member below the upper power storage module. Moreover, the lower power storage module may be constructed so that it is fixed to the frame member with the outlet being located at a side face of the frame member that extends downwardly from the top face, and the outlet is directly connected to a second communication hole of the discharge space formed in the side face. With such a construction, it is unnecessary to provide a separate discharge pipe or the like for the outlet of the lower power storage module, and since the outlet of the lower power storage module is provided so as to be located at the side face extending downwardly from the top face of the frame member, it is possible to lower the overall center of gravity of the stacked power storage modules with respect to the frame member. By lowering the overall center of gravity of the stacked power storage modules, for example, a distance (a moment arm) from the frame member to the overall center of gravity of the entire power storage modules is shortened, and it is possible to achieve lightweight by reducing the thickness of the plate for the bracket, and so on.

The above on-board power source device may be constructed so that a plurality of power storage module units each consisting of power storage modules stacked one upon another are adjacently arranged in a direction in which the frame member extends. At this time, one bracket may be provided for a plurality of adjacent power storage module units, and may be constructed to have a plurality of passage parts corresponding to the respective power storage module units. With such a construction, it is possible to further reduce the number of the parts.

The above power storage modules each may be constructed to have: a holder that has a plurality of opening portions respectively for insertion of the plurality of power storage elements and that holds an end side of the respective power storage elements; a first bus bar that is formed with a plurality of first connection portions corresponding to the respective power storage elements arranged in the plane, each of the first connection portions being connected to a first end, which constructs one of electrodes of the power storage elements at an end side of the power storage elements inserted into the holder and which is provided with the discharge valve, and protruding from a plate shaped base portion extending in the plane towards the first end; a second bus bar that is formed with a plurality of second connection portions corresponding to the respective power storage elements arranged in the plane, each of the second connection portions being connected to a second end, which constructs the other of the electrodes of the power storage elements at the other end side of the power storage elements; and a cover member for covering the first end of the respective power storage elements arranged in the plane via the first bus bar to form the discharge path for the gas.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Below, the embodiments of the invention will be described.

The First Embodiment

An on-board power source device according to the first embodiment of the invention will be described. The on-board power source device 1 of the present embodiment is mounted, for example, on a vehicle such as a hybrid vehicle, an electric power vehicle, and so on, and is used as a power source device for supplying electric power to a motor for driving.

The on-board power source device 1 of the present embodiment may be mounted, for example, in the luggage space located behind the rear seats, and may be fixed on the floor panel P of the vehicle. In addition to the luggage space, the on-board power source device 1 can also be arranged in the passenger space, that is, below the driver's seat or the front passenger's seat and/or below the rear seats.

Figure 1:
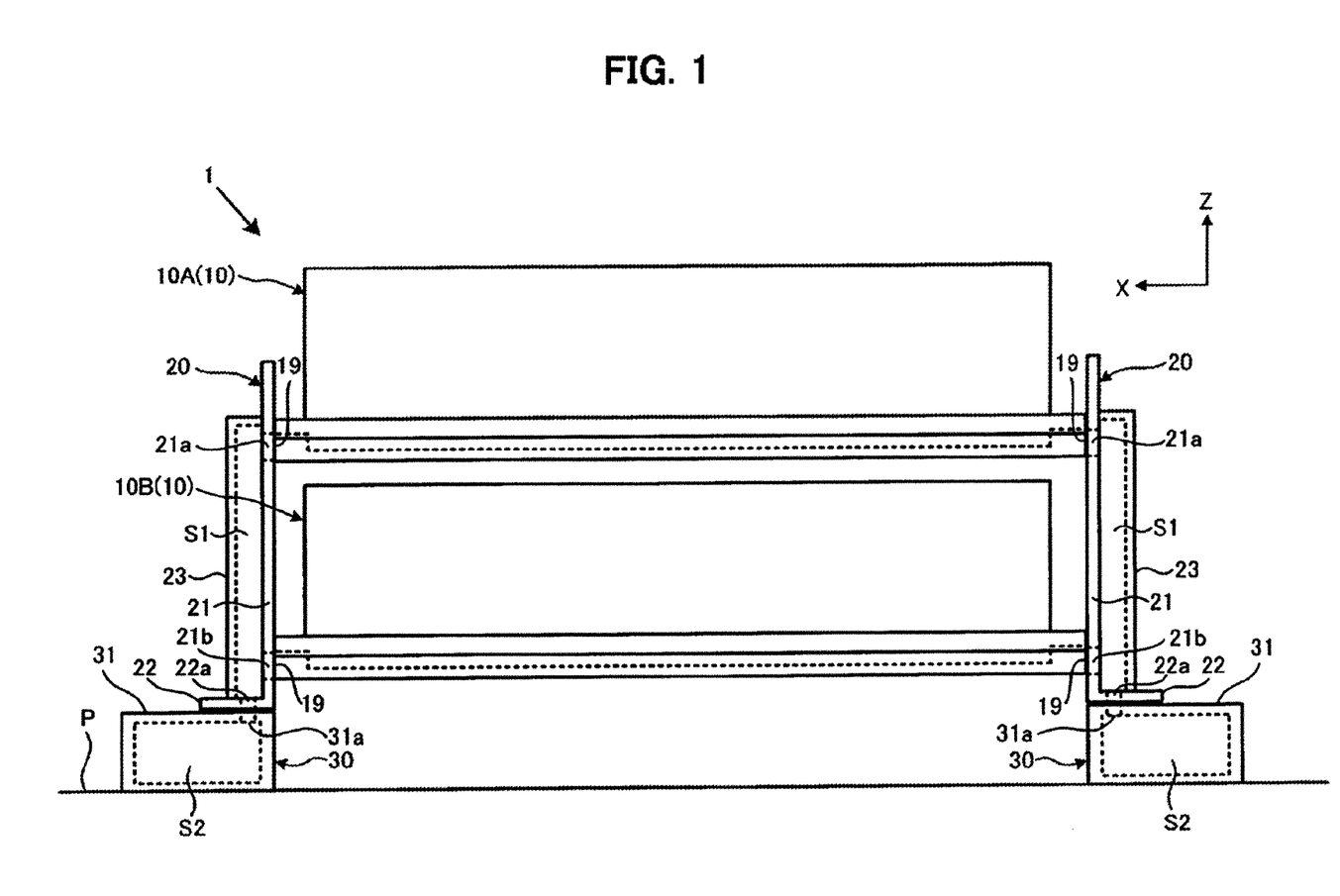
FIG. 1 is a side view of an on-board power source device in a first embodiment.

FIG. 1 is a side view of the on-board power source device 1 of the present embodiment. The on-board power source device 1 is constructed as including a plurality of battery modules 10. In the present embodiment, in order to improve the utilization efficiency of the on-board space, two battery modules (corresponding to the power storage modules) 10A, 10B are provided to be stacked one upon the other. In addition, X axis, Y axis, and Z axis are axes orthogonal to each other. In the present embodiment, the direction equivalent to the vertical direction is set as the Z axis. The relationship among the X axis, the Y axis, and the Z axis is the same in other figures.

The respective battery modules 10A, 10B arranged one upon the other in the Z axis are fixed to frame members 30 via L shaped brackets 20. The battery modules 10A, 10B extend in the X direction, and the brackets 20 and the frame members 30 are provided in pair at both sides of the end portions in the X direction (end portions in the longitudinal direction) of the battery modules 10A, 10B.

The brackets 20 are arranged so as to sandwich the battery modules 10A, 10B from both sides of the end portions of the battery modules 10A, 10B in the X direction. The brackets 20 each include a fixing portion 21 extending in the Z direction and a fixing portion 22 extending from the lower end of the fixing portion 21 in the X direction. The battery modules 10A, 10B are fixed to the fixing portions 21 extending vertically from the fixing portions 22, and the fixing portions 22 are fixed to the frame members 30.

The interior of the frame member 30 is formed to be hollowed, and the frame member 30 is fixed to the floor panel P of the vehicle. The frame member 30 has its cross section of a rectangle shape in X-Z plane, and the fixing portion 22 is fixed to a top face 31 of the frame member 30. The fixing of the battery modules 10A, 10B to the brackets 20 and the fixing of the brackets 20 to the frame members 30 can be achieved, for example, by welding and/or by fastening using fasteners such as bolts and so on.

In addition, the bracket 20 in the present embodiment further includes a passage part 23 which extends vertically from the fixing portion 22 corresponding to the respective battery modules 10A, 10B arranged in a manner of stacking into two upper and lower layers. The passage part 23 is a duct for communicating the respective outlets 19 of the battery modules 10 with a discharge space S2 in the hollow interior of the frame member 30 for discharging gas to the outside of the vehicle. The interior of the passage part 23 is formed to be hollowed, and the hollowed interior is constructed as a discharge space S1 for the gas.

Here, the battery module 10 of the present embodiment will be described with reference to FIG. 2. The battery module 10 includes a plurality of cells (corresponding to the power storage element) 11. The cells 11 each are so-called cylindrical battery, and a power generating element is contained in a cylindrical battery case. As the cells 11, secondary battery such as nickel metal hydride battery, lithium ion battery, and so on, can be used. In addition, electrical double layer capacitor can be used instead of the secondary battery.

Figure 2:
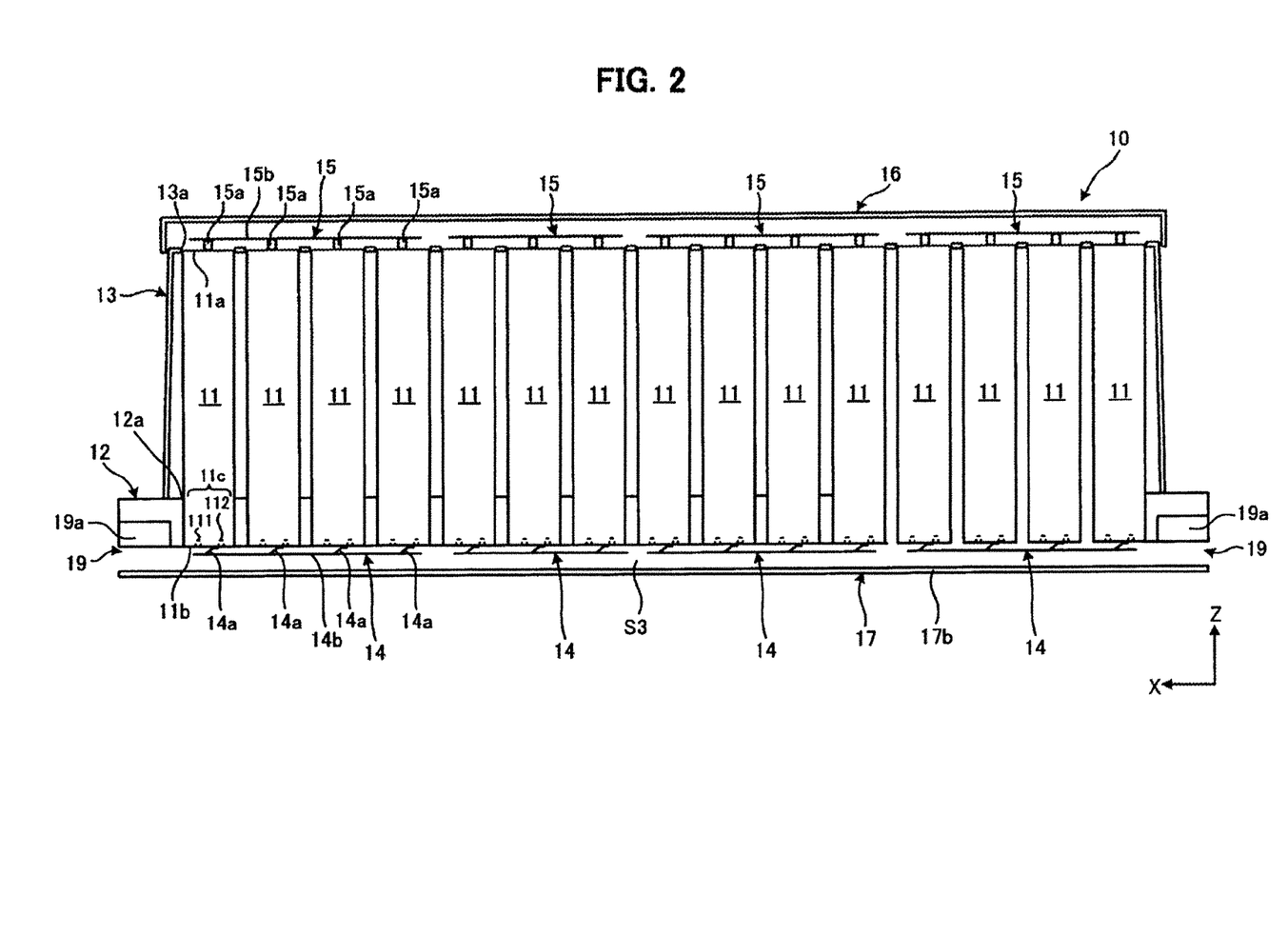
FIG. 2 is a sectional view of a battery module in the first embodiment.

As shown in FIG. 2, the cells 11 each extend in the Z direction, and positive terminals 11a and negative terminals 11b are provided at both ends in the length direction (Z direction) of the cells 11. The battery case as the package of the cells 11 each can be consisted of a case body and a cover, and the cells 11 each can be constructed by containing the power generating element in the cylindrical case body and closing the case body by the cover.

Between the cover and the case body, a gasket made from insulation material is provided. The cover is electrically connected with a positive plate of the power generating element, and is used as the positive terminal 11a of the cell 11. The case body is electrically connected with a negative plate of the power generating element and is used as the negative terminal 11b of the cell 11. In the present embodiment, an end surface of the case body opposite to the cover (positive terminal 11a) in the Z direction is used as the negative terminal 11b, and the positive terminal 11a and the negative terminal 11b are located at the opposite ends in the Z direction.

As shown in FIG. 2, all the cells 11 constructing the battery module 10 (10A, 10B) are arranged so that the positive terminals 11a are located above. The positive terminals 11a of all the cells 11 are all arranged in the same plane (X-Y plane). This also applies for the negative terminals 11b.

The respective cells 11 are held by a holder 12 as a hold member. The holder 12 includes a plurality of opening portions 12a for inserting the respective cells 11. The opening portions 12a are formed to follow the shape (in particularly, circular shape) of the outer circumferential face of the cells 11, and are provided according to the number of the cells 11. The holder 12 is formed, for example, by a metal material with excellent heat conductivity such as aluminum and so on and/or a resin material with excellent heat conductivity. In addition, between the opening portions 12a of the holder 12 and the respective cells 11, an insulator made of insulation material such as resin and so on can be arranged.

A module case 13 is formed, in the X-Y plane, into a shape enclosing the plurality of cells 11 held by the holder 12, and the plurality of cells 11 are housed inside the module case 13. The module case 13 can be made of insulation material such as resin and so on, and is formed with a plurality of opening portions 13a on a top face at the positive terminal 11a side of the respective cells 11. The opening portions 13a are used for inserting the end at the positive terminal 11a side of the respective cells 11.

In addition, in a side face of the module case 13 in the X direction, a plurality of slits (not shown) may be provided as ventilation ports. The slits can be formed in each side faces of the module case 13 at a predetermined interval. For example, cooling air can be introduced from the slits in one side surface. The cooling air flows along the Y direction in the battery module 10, and may flow out of the battery module 10 from the slits on the other side surface, so as to cool the cells 11.

The area at the negative terminal 11b side of the cells 11 is positioned in the X-Y plane by the opening portions 12a of the holder 12, the area at the positive terminal 11a side of the cells 11 is positioned in the X-Y plane by the opening portion 13a of the module case 13. The both ends of the cells 11 in the length direction (Z direction) are respectively positioned by the holder 12 and the module case 13, so that two adjacent cells 11 in the X-Y plane is prevented from contacting with each other.

Figure 3:
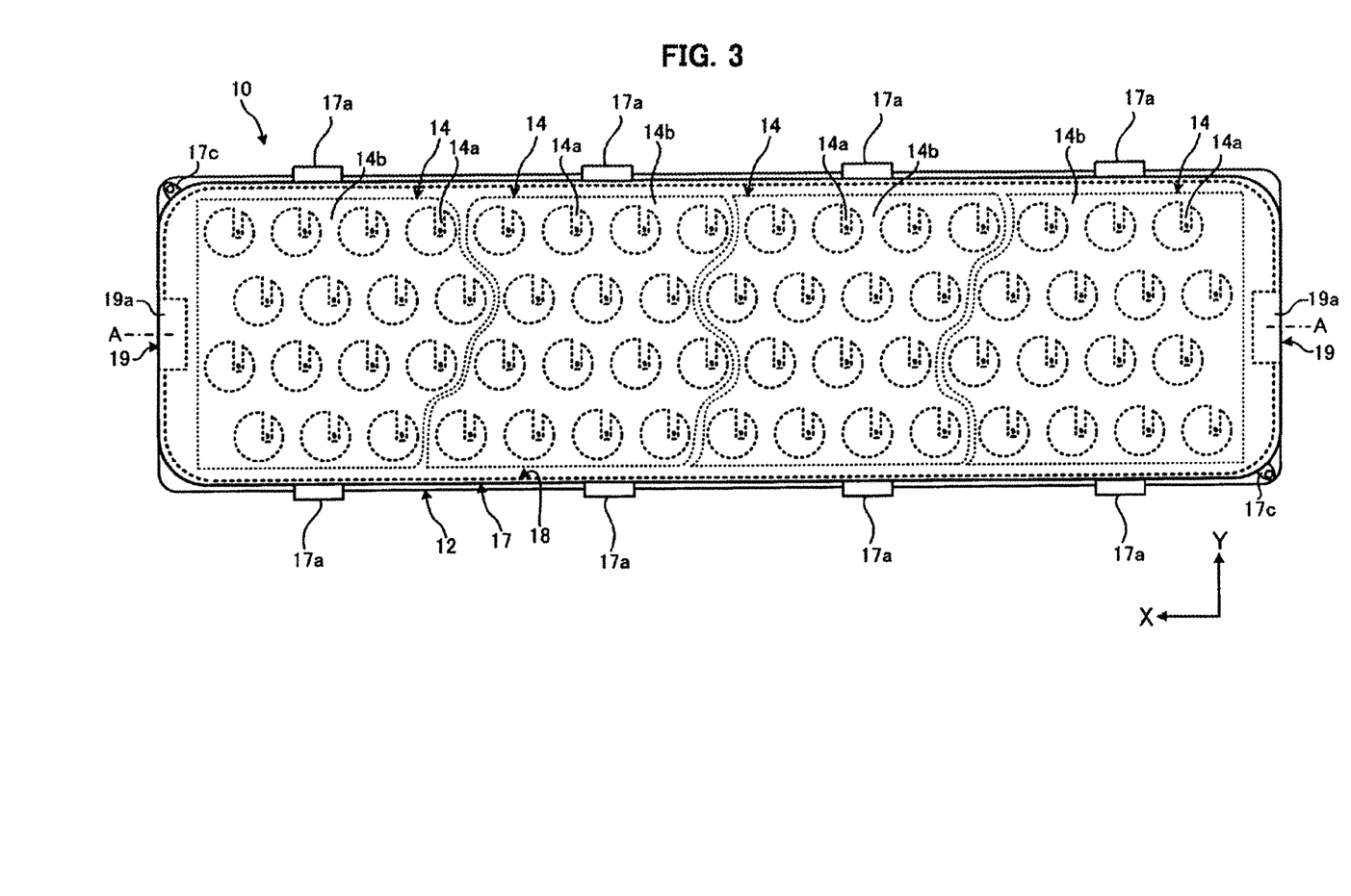
FIG. 3 is a bottom view of the battery module in the first embodiment.

As shown in FIG. 2 and FIG. 3, the battery module 10 of the present embodiment is provided in such a state that based on the holder 12, the end at the negative terminal 11b side of each of the cells 11 is inserted into the respective opening portion 12a, and each of the cell 11 is erected upward from the holder 12. Furthermore, a bus bar 14 (corresponding to the first bus bar) is provided at the respective negative terminal 11b side of the cells 11 exposed from the opening portion 12a of the holder 12, and the negative terminals 11b are connected with connection portions 14a (corresponding to the first connection portions). Also, a bus bar 15 (corresponding to the second bus bar) is provided at the positive terminals 11a of the cells 11 exposed upwardly from the opening portions 13a of the module case 13, and the positive terminals 11a are connected with connection portions 15a (corresponding to the second connection portions). In addition, FIG. 2 is a sectional view along line A-A of FIG. 3.

As shown in FIG. 2, the connection portions 14a are provided at positions opposite to the negative terminals 11b in the Z direction, and the negative terminals 11b can be connected with the connection portions 14a by welding and so on. The bus bar 14, as a negative bus bar, carries charges from the respective negative electrodes of the plurality of cells 11 as a whole.

The respective negative terminals 11b of the plurality of cells 11 are located at the lower side end surface of the holder 12, and the negative terminals 11b exposed from the opening portions 12a are connected with the bus bar 14. The bus bar 14 is formed from conductive material such as metal. The bus bar 14 includes a plurality of connection portions 14a connected with the respective negative terminals 11b of the cells 11, and the connection portions 14a are provided in the X-Y plane according to the number of the cells 11 (negative terminals 11b).

The bus bar 14 according to the present embodiment can be formed by punching a planar plate shaped member which has a thickness (plate thickness) direction in the Z direction, and the plurality of connection portions 14a (see FIG. 3) are formed at a predetermined interval at the positions corresponding to the arrange positions of the cells 11 (negative terminals 11b). The bus bar 14 is arranged at a predetermined distance with respect to the plurality of cells 11 (negative terminals 11b) in the Z direction, and the connection portions 14a protruding from the plate shaped member (base portion 14b) in the Z direction are connected to the negative terminals 11b of the cells 11 by welding.

The connection portions 15a of the bus bar 15 in the present embodiment are provided at positions opposite to the positive terminals 11a in the Z direction, and the positive terminals 11a are connected with the connection portions 15a by welding and so on. The bus bar 15, as a positive bus bar, carries charges from the respective positive electrodes of the cells 11 as a whole.

Like the bus bar 14, the bus bar 15 can be formed by punching a planar plate shaped member. The connection portions 15a are formed into a shape protruding from the plate shaped member (base portion 15b) towards the positive terminals 11a of the cells 11, and a plurality of connection portions 15a are formed in the X-Y plane at a predetermined interval according to the number of the cells 11 (the positive terminals 11a).

The bus bar 15 is arranged at a predetermined distance with respect to the plurality of cells 11 (positive terminals 11a) in the Z direction, and the connection portions 15a protruding from the plate shaped member in the Z direction are connected to the positive terminals 11a of the cells 11.

The connection portions 15a in the present embodiment are connection portions electrically connected with the positive terminals 11a of the cells 11, and are used as fuses which interrupt the electrical connection with the respective cells 11 (positive terminals 11a) when the current flowing therethrough is at or above a predetermined value. For example, the connection portions 15a can be constructed so that the width thereof is smaller than that of the connection portions 14a of the bus bar 14, and the upper limit current value in terms of fusing character is smaller than that of the connection portions 14a of the bus bar 14.

The plurality of cells 11 in the present embodiment are arranged so that the orientation of the positive terminals 11a (or the negative terminals 11b) of the cells 11 become the same orientation in the Z direction. Furthermore, the respective negative terminals 11b are connected to one bus bar 14, and the respective positive terminals 11a of the cells 11 are connected to one bus bar 15, and thus, the plurality of cells 11 are electrically connected in parallel. In addition, the area of the bus bars 14, 15 other than the connection portions can be covered by insulation films.

As shown in FIG. 3, in the battery module 10, fifteen cells 11 are connected in parallel by using the bus bars 14, 15 to construct one battery block, and the respective battery blocks are connected in series. By connecting a lead portion of the bus bar 14 of one battery block and a lead portion of the bus bar 15 of another adjacent battery block arranged in the X direction, the respective battery blocks can be connected in series. In addition, the battery module can also be constructed by battery blocks in which all the cells 11 are connected in parallel.

At a top face of the battery module 10, a cover member 16 is provided for covering the bus bar 15 from above. The cover member 16 is formed into such a shape that it extends in the X-Y plane and covers the entire top face of the module case 13 from which the respective positive terminals 11a (corresponding to the second end portion) of the cells 11 are exposed. For example, the cover member 16 can be fixed to the module case 13, and like the module case 13, can be made from resin.

On the other hand, a cover member 17 for covering the bus bar 14 is provided at a bottom face of the battery module 10. The cover member 17 is also formed into such a shape that it extends in the X-Y plane and covers the entire bottom face of the holder 12 from which the respective negative terminals 11b of the cells 11 are exposed. The cover member 17 is a metal member which is used to cover the negative terminal 11b (corresponding to the first end portion) side of the cells 11 arranged in the X-Y plane to form a discharge path (discharge space) S3 for gas. For example, as shown in FIG. 3, the cover member 17 can be provided with a locking part 17a for locking into the side face of the holder 12. The locking part 17a can be formed by making a part of the end portions of a cover portion 17b covering the bus bar 14 in the X-Y plane extend in the Z direction.

The cover member 17 can be constructed so that it is fixed to the holder 12 with the locking part 17a, and as shown in FIG. 3, has a fastening portion 17c for fastening in the Z direction in the X-Y plane, and is fixed to the holder 12 via the fastening portion 17c by means of fasteners.

As shown in FIG. 2, the cells 11 in the present embodiment each is provided with a discharge valve 11c for discharging gas generated inside the cell 11 to the outside. The discharge valve 11c can be provided at the bottom of the case body constructing the negative terminal 11b. The discharge valve 11c is, for example, a broken valve which, as shown in FIG. 2, can be constructed by grooves 111, 112 formed in the bottom of the case body constructing the negative terminal 11b. In response to the increased inner pressure of the cell 11 due to the generation of the gas, the bottom of the case body is broken from the grooves 111, 112, and thus it is possible to discharge the internal gas outside of the cell 11.

At the bottom face of the battery module 10, a wall portion 18 is provided around an area in which the bus bars 14 are arranged. The wall portion 18 is a seal portion, and an end of the wall portion 18 contacts the inner side of the cover portion 17b of the cover member 17, so as to seal the discharge path S3 formed by the holder 12 and the cover member 17.

The gas discharged from the inside of the cell 11 through the discharge valve 11c flows into the discharge path S3 between the holder 12 and the cover member 17, and while contacting with the inner side of the cover portion 17b in the Z direction, is guided to an outlet 19 provided at the end of the discharge path S3 extending in the X direction. At this time, with the cover member 17 made from metal material, during a period till the gas reaches the outlet 19, the gas at a high temperature state is cooled down by contacting with the cover member 17, and it is possible to decrease the temperature of the gas discharged from the outlet 19.

The outlet 19 is provided at the X direction end of the discharge path S3 which is formed between the bottom face of the holder 12 and the cover member 17, or in other words, is provided at the X direction end of the battery module 10 in a direction in which the plurality of cells 11 are arranged. The X direction end of the holder 12 is formed with a recess 19a recessed upwardly. The bottom of the recess 19a is covered by the cover member 17, and the outlet 19 is opened in the X-Z plane at the X direction end of the battery module 10, and is communicated with the discharge path S3. As shown in FIG. 3, the recess 19a is formed at a generally central portion of the X direction end of the holder 12, and the outlet 19 is located at a generally center of the X direction end of the battery module 10.

The discharge path S3 extends in the length direction (X direction) of the battery module 10, at the end at which the outlet 19 is provided, the width in the Z direction is enlarged due to the recess 19a. The X direction ends at both sides of one battery module 10 are each provided with a respective outlet 19.

Figure 4:
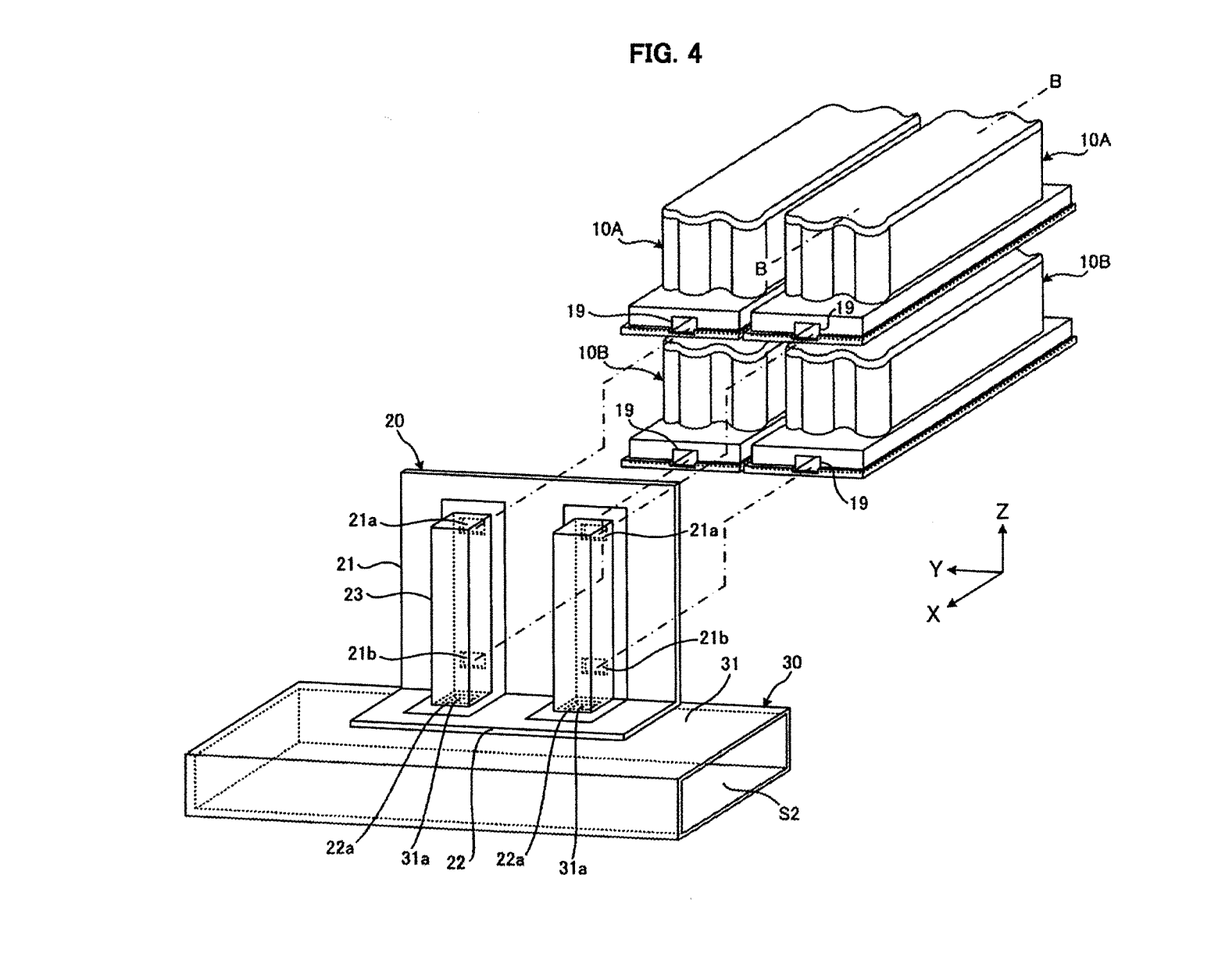
FIG. 4 is a view illustrating the fixing structure of battery modules stacked into upper and lower layers in the first embodiment, and is a structural perspective view of the frame member, the bracket and the battery modules in the upper and lower layers.
Figure 5:
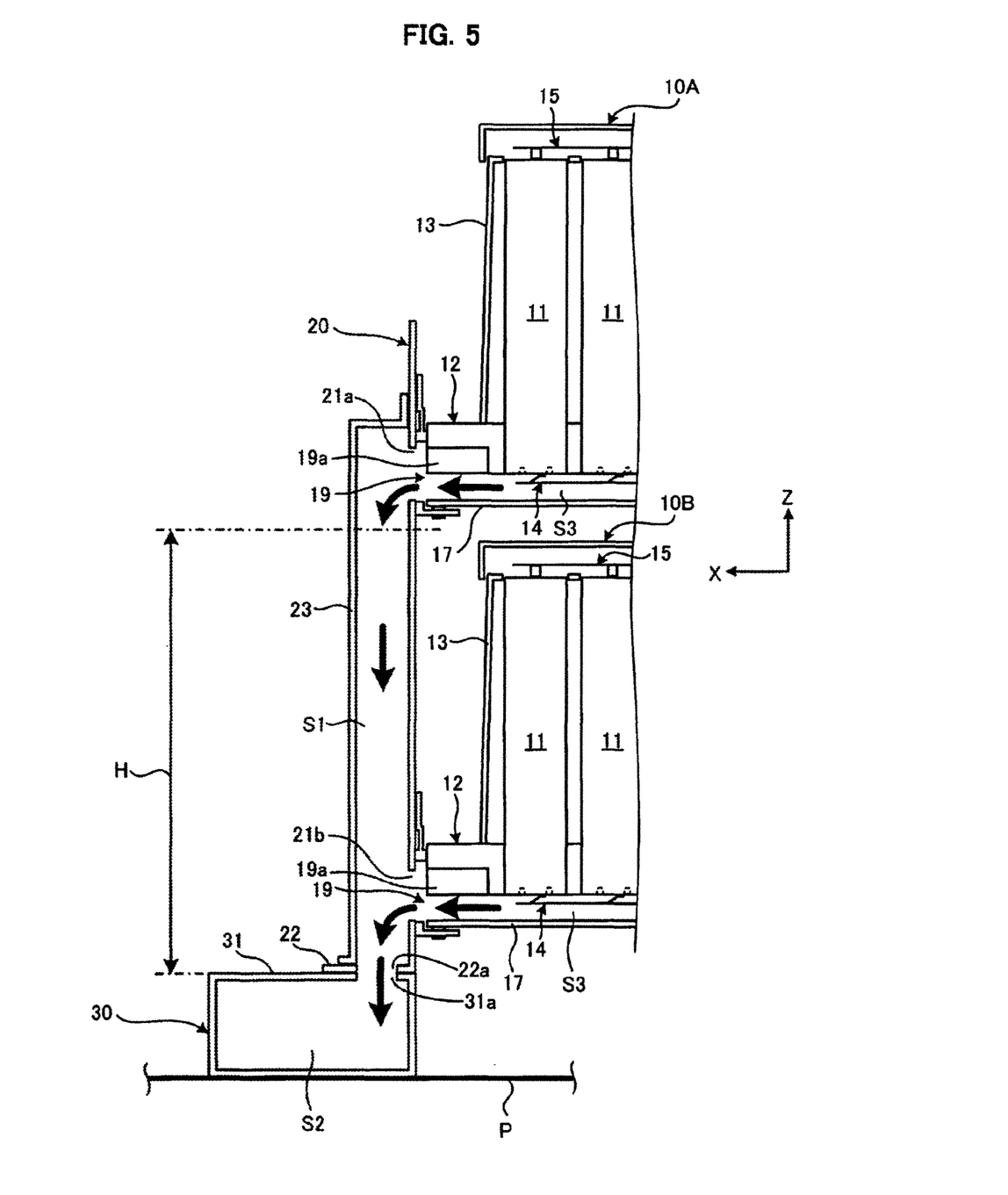
FIG. 5 is a sectional view showing the fixing structure of the battery modules stacked into upper and lower layers in the first embodiment.

FIG. 4 is a view illustrating the fixing structure of the battery modules 10A, 10B stacked into the upper and lower layers, and is a structural perspective view showing the battery modules 10A, 10B in the upper and lower layers, the bracket 20 and the frame member 30. FIG. 5 is a B-B sectional view showing the fixing structure of the battery modules 10A, 10B stacked into the upper and lower layers. In addition, in the example of FIG. 4 and FIG. 5, the fixing structure at one X direction end side of the battery modules 10A, 10B stacked into the upper and lower layers is shown, and since the other X direction end side of the battery modules 10A, 10B has the same fixing structure as shown in FIG. 1, the illustration is omitted. This also applies for FIG. 7 and FIG. 8.

As shown in FIG. 4, the two battery modules 10A, 10B stacked into the upper and lower layers construct one module unit (corresponding to the power storage module unit), and two module units are arranged side by side in the Y direction. In one module unit, the respective battery modules 10A, 10B are stacked one upon the other in the Z direction with the length direction consistent. For this reason, the respective outlets 19 of the battery modules 10A, 10B are arranged one upon the other, and are located at the X direction ends.

In addition, in the adjacent module units, the respective outlets 19 of the upper battery modules 10A, 10A are arranged side by side in the Y direction. This also applies for the respective outlets 19 of the lower battery modules 10B, 10B.

The frame member 30 extends along the end of one module unit where the respective outlets 19 are arranged, and is arranged below the fixing portion 22 of the bracket 20. The frame member 30 is formed to be elongated in the Y direction, and is arranged so that the length direction of the frame member 30 is orthogonal to the length direction of the battery modules 10A, 10B.

As shown in FIG. 4 and FIG. 5, the bracket 20 is provided at the X direction end of the module unit in such a manner that the fixing portion 21 covers the outlets 19. The fixing portion 21 is provided with opening portions 21a, 21b (corresponding to the first communication portion, the second communication portion) spaced in the Z direction. Each of the opening portions 21a corresponds to the outlet 19 of the upper battery module 10A of one module unit, and each of the opening portions 21b corresponds to the outlet 19 of the lower battery module 10B. The passage part 23 forms a closed discharge space S1 for guiding the gas discharged from the outlet 19 to the discharge space S2 of the frame member 30. The discharge space S1 is communicated with the respective outlets 19 of the upper and lower battery modules 10A, 10B via the opening portions 21a, 21b. The opening portions 21a, 21b are communication portions for communicating the passage part 23 with the outlets 19.

The passage part 23 extends from the outlet 19 of the upper battery module 10A towards the top face 31 of the frame member 30 via the outlets 19 of the lower battery module 10B, and the end of the passage part 23 that is lower than the second opening portion 21b is connected to the fixing portion 22.

At a position of the fixing portion 22 where the end of the passage part 23 is connected, an opening portion 22a is formed for communicating with the discharge space S2 of the frame member 30. Furthermore, in the top face 31 of the frame member 30, a communication hole 31a is formed at a position where the opening portion 22a is formed. The passage part 23 is constructed so that it is connected with the communication hole 31a via the opening portion 22a, and the discharge space S1 is communicated with the discharge space S2 via the opening portion 22a and the communication hole 31a. The opening portion 22a is a communication portion for communicating the passage part 23 with the discharge space S2 of the frame member 30.

In one bracket 20, a plurality of passage parts 23 can be provided according to the module units adjacently arranged in the Y direction. That is, in the present embodiment, one bracket 20 is provided for two adjacent module units, and this bracket 20 is provided with the respective passage parts 23, 23 corresponding to the respective module units. The one bracket 20 is used to fix the two module units adjacent in the Y direction to the frame member 30.

The respective battery modules 10A, 10B of one module unit are fixed to the fixing portion 21 of the bracket 20. Specifically, the respective ends of the holder 12 and the cover member 17 other than the area in which the outlets 19 are provided are fixed to a face opposite to the face on which the passage part 23 is provided. At this time, the opening portion 21a aligns with the outlet 19 of the upper battery module in the X-Z plane, and the connection portion of the opening portion 21a and the outlet 19 can be sealed by a seal member. This also applies for the opening portion 21b and the outlet 19 of the lower battery module 10B, and in addition, this also applies for the other adjacent module unit.

As shown in FIG. 5, the passage part 23 in the present embodiment can be constructed by providing the bracket consisting of the fixing portion 21 and the fixing portion 22 and being of L shape viewed in the X-Z plane with another bracket for forming a closed section (discharge space S1) connecting with the opening portions 21a, 21b of the fixing portion 21 and the opening portion 22a of the fixing portion 22. Therefore, the passage part 23 becomes a pillar providing in the Z direction with respect to the plate like fixing portion 21 which has a larger width in the Y direction, and functions as an reinforcement member for improving the strength of the bracket 20, and functions as a chamber for the gas discharged from the battery modules 10A, 10B.

In the on-board power source device 1 according to the present embodiment, it is unnecessary to provide a separate discharge pipe or the like for the respective outlets 19 of the respective battery modules 10A, 10B stacked one upon the other, and as shown by thick line in FIG. 5, the gas discharged outside of the battery modules 10A, 10B from the respective outlets 19 is introduced into the hollow interior of the frame member 30 through the passage part 23 of the bracket 20. Therefore, it is possible to merge the gas discharged from the respective upper and lower battery modules 10A, 10B into the discharge space S2 of the frame member 30 via the bracket 20 and discharge the same to the outside of the vehicle. Because it is unnecessary to separately connect the respective outlets 19 of the module units with the outside of the vehicle with respect to the fixing structure of the module units, it is possible to reduce the number of the parts and improve the utilization efficiency of the space in the discharge construction for the gas.

In addition, in order to improve the utilization efficiency of the on-board space, the on-board power source device 1 in the present embodiment includes the fixing structure in which the respective battery modules in the upper and lower two layers are fixed to the frame member 30 via the bracket 20, the bracket 20 is provided with the passage part 23 communicated with the outlets 19, and the gas is introduced into the hollow interior of the frame member 30 via the passage part 23. Therefore, in the battery modules 10A, 10B stacked one upon the other, even it is so constructed that the passage part 23 is only communicated with the outlet 19 of the upper battery module 10A, it is unnecessary to separately connect the outlet 19 of the upper battery module 10A with the outside of the vehicle with respect to the fixing structure of the battery modules 10A, 10B stacked one upon the other, and it is possible to reduce the number of the parts and improve the utilization efficiency of the space associated with the discharge construction for the gas. In addition, in this case, the lower battery module 10B can be fixed to the frame member 30 via the bracket 20, and can be constructed so as to connect a discharge pipe with the outlet 19 of the lower battery module 10B without through the passage part 23, to flow the gas into the frame member 30.

In addition, as shown in FIG. 4, because the two module units adjacent in the Y direction can be fixed to the frame member 30 by using one bracket 20, it is unnecessary to use a plurality of brackets 20 according to the module units. Therefore, it is possible to further reduce the number of the parts and improve the utilization efficiency of the space associated with the discharge construction for the gas. In addition, in the present embodiment, although one bracket 20 is used to fix two module units to the frame member 30, the bracket 20 can also be provided according to the module units. In this case, since it is also unnecessary to separately connect the respective outlets 19 with the outside of the vehicle with respect to the fixing structure of the battery modules 10A, 10B stacked one upon the other, it is still possible to reduce the number of the parts and to improve the utilization efficiency of the space associated with the discharge construction for the gas.

Figure 6:
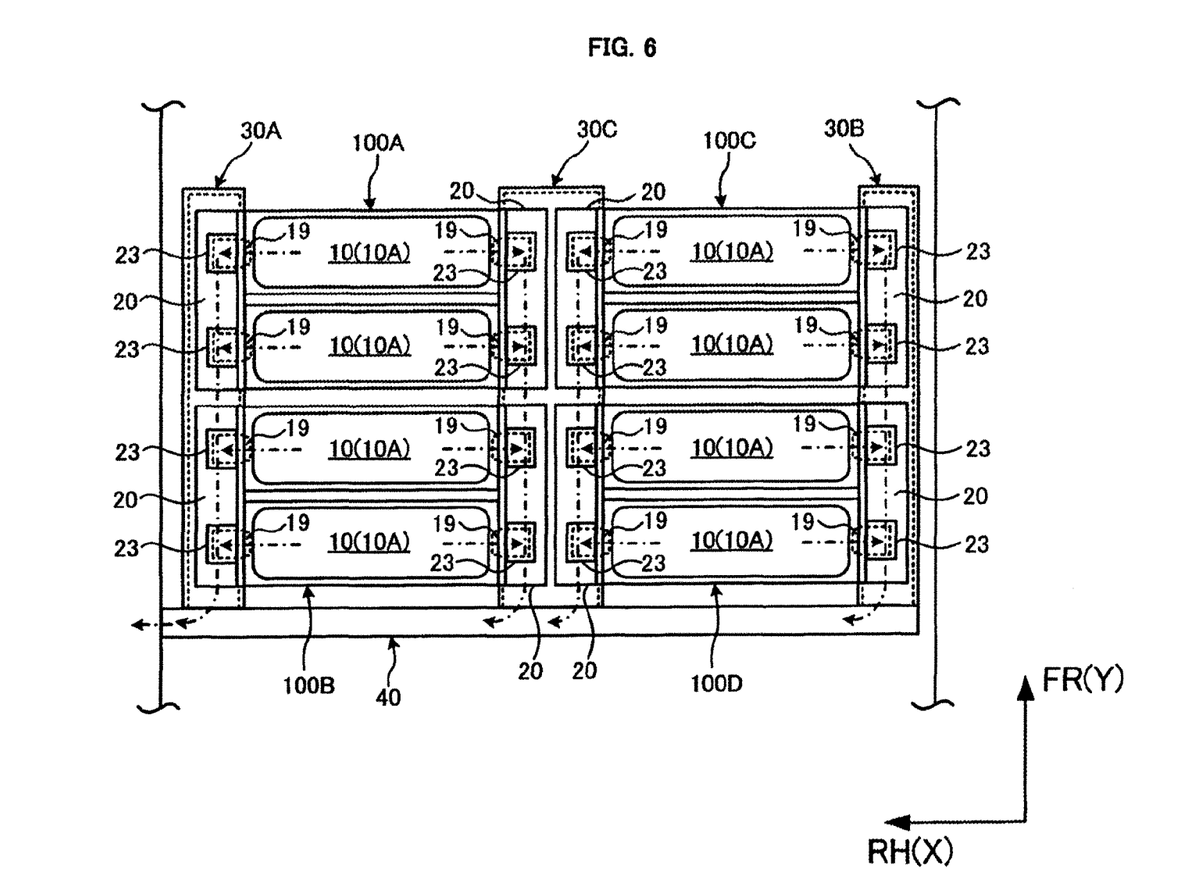
FIG. 6 is a top view of the on-board power source device of the first embodiment, and is a view for illustrating the path for discharging gas discharged from the respective battery modules to the outside of the vehicle.

FIG. 6 is a top view showing the on-board power source device including a plurality of module units, and is a view illustrating the path of the gas discharged from the respective battery modules 10 to the outside of the vehicle. In FIG. 6, FR direction represents the forward-rearward direction of the vehicle, and corresponds to the Y direction in other figures. In addition, RH direction represents the leftward-rightward direction of the vehicle, and corresponds to the X direction in the other figures, and the Z direction corresponds to the height direction of the vehicle. The dot-and-dash line indicates the flow of the gas.

In the example in FIG. 6, a mode in which two module units adjacent in the FR direction are used as one battery unit and are fixed to the frame member 30 via one (a pair of) bracket 20 is shown. As shown in FIG. 6, the battery units 100A, 100B and the battery units 100C, 100D are arranged into two rows in the RH direction. As shown in FIG. 4, one battery unit is a unit formed by arranging two module units consisting of upper and lower two layers of battery modules 10A, 10B in the FR direction, and consists of four battery modules 10 in total.

A first frame member 30A is provided along the end of the battery unit 100A, 100B at the left side in the RH direction, and a second frame member 30B is provided along the end of the battery units 100C, 100D at the right side in the RH direction. The third frame member 30C is a frame member 30 commonly provided for the battery units 100A, 100B and the battery units 100C, 100D.

The bracket 20 provided at the right side end in the RH direction of the battery units 100A, 100B and the bracket 20 provided at the left side end in the RH direction of the battery units 100C, 100D are fixed to the third frame member 30C. Therefore, the third frame member 30C is formed so as to be wider in the RH direction than the first frame member 30A and the second frame member 30B.

The front side in the FR direction of the respective frame members 30A, 30B, 30C is closed, and the rear side in the FR direction is opened. At the rear side in the FR direction of the respective frame members 30A, 30B, 30C, a discharge passage 40 extending in the RH direction is provided, which is connected with the respective discharge space S2 extending in the FR direction. An end of the discharge passage 40 is communicated to the outside of the vehicle, and the gas flowing into the passage part 23 from the respective outlets 19 of the respective battery units 100A, 100B, 100C, 100D is merged into the discharge spaces S2 of the respective frame members 30A, 30B, 30C, and is further merged into the discharge passage 40 from the respective discharge spaces S2 and is discharged to the outside of the vehicle.

In addition, in the example in FIG. 6, instead of merging by means of the discharge passage 40, it is also possible that a discharge pipe or the like is connected to communicate the respective discharge spaces S2 of the respective frame members 30A, 30B, 30C with the outside of the vehicle. In addition, while the front side in the FR direction of the respective frame members 30A, 30B, 30C is closed, it is also possible that the rear side in the FR direction is similarly provided with the discharge passage 40, and the respective frame members 30A, 30B, 30C are connected with the respective discharge passages 40 at the front and rear sides in the FR direction. Further, it is also possible to be constructed that only the front side in the FR direction is provided with the discharge passage 40, contrary to the example of FIG. 6.

The Second Embodiment

Figure 7:
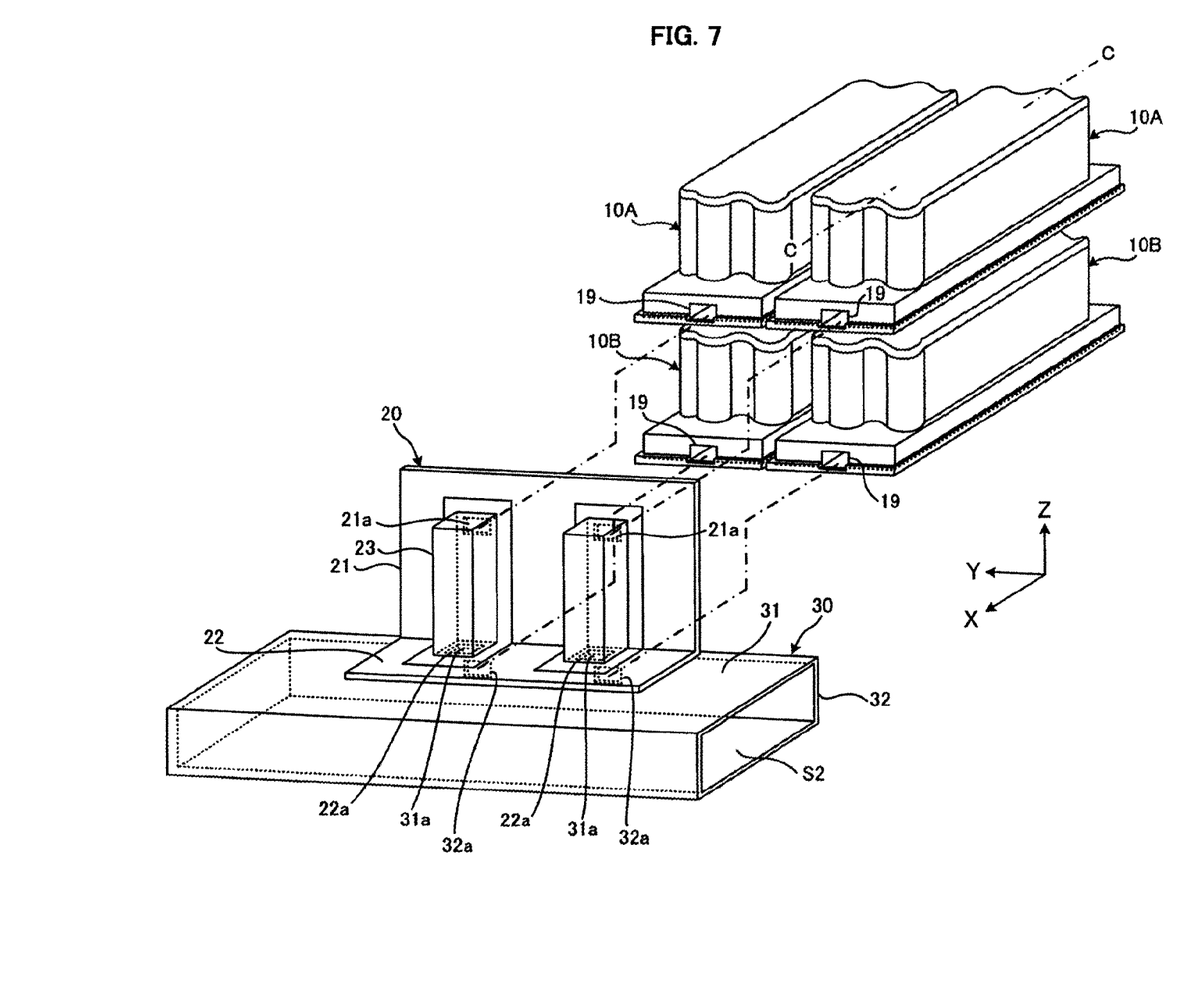
FIG. 7 is a view illustrating the fixing structure of battery modules stacked into upper and lower layers in a second embodiment, and is a structural perspective view of the frame member, the bracket and the respective battery modules in the upper and lower layers.
Figure 8:
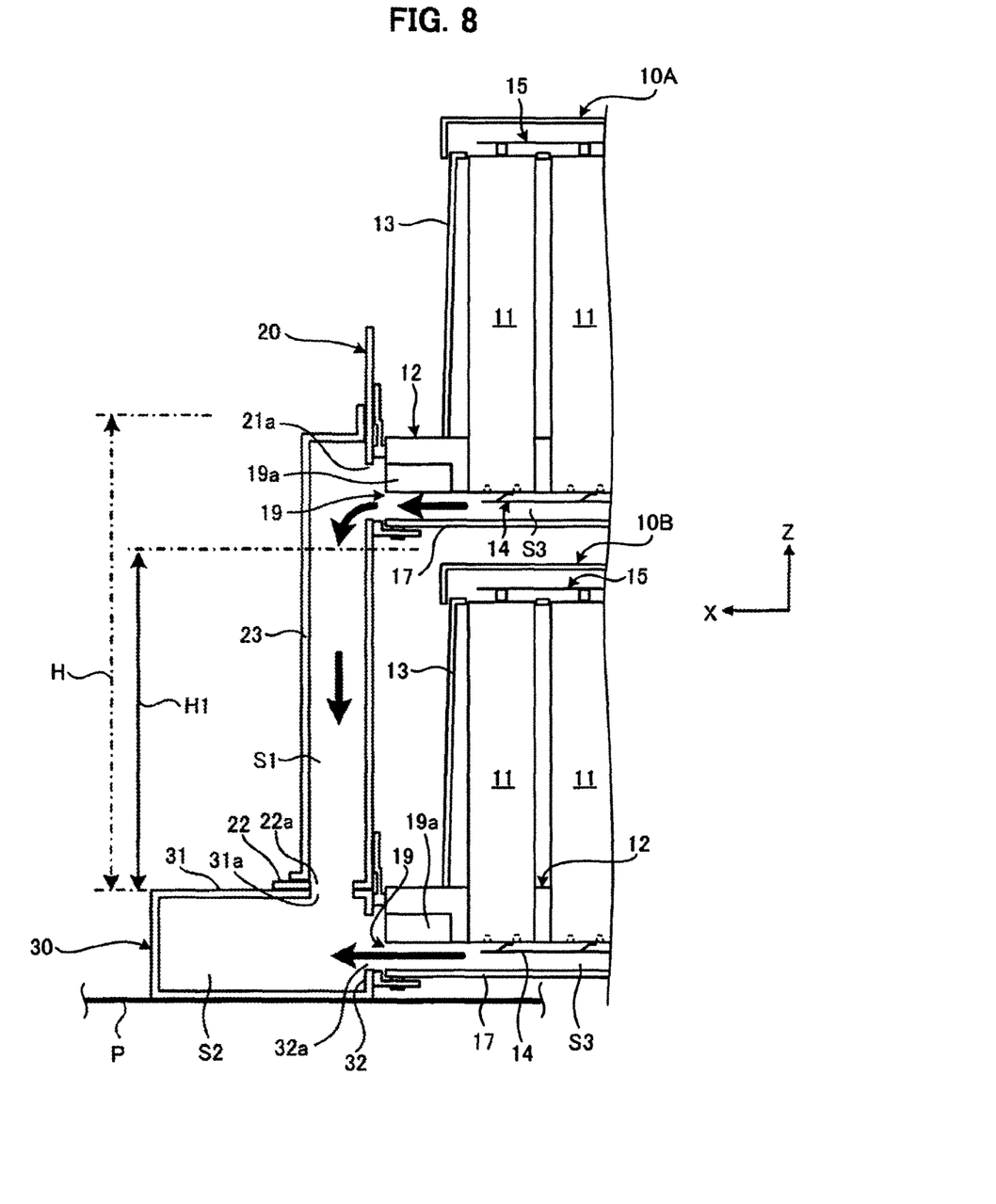
FIG. 8 is a sectional view showing the fixing structure of the battery modules stacked into upper and lower layers in the second embodiment.

FIG. 7 and FIG. 8 are views showing the second embodiment. FIG. 7 is a view illustrating the fixing structure of the battery modules 10A, 10B stacked into upper and lower layers according to the present embodiment, and is a structural perspective view of the battery modules 10A, 10B in the upper and lower layers, the bracket 20 and the frame member 30. FIG. 8 is a C-C sectional view of the fixing structure of the battery modules 10A, 10B stacked into the upper and lower layers. Similar to the first embodiment shown in FIG. 4 and FIG. 5, the example in FIG. 7 and FIG. 8 shows the fixing structure at one end side in the X direction of the battery modules 10A, 10B stacked into the upper and lower layers.

While the above first embodiment shows a mode in which the respective outlets 19 of the battery modules 10A, 10B stacked one upon the other are communicated with the passage part 23, in the present embodiment, the outlet 19 of the lower battery module 10B is directly connected to the discharge space S2 of the frame member 30.

As shown in FIG. 7 and FIG. 8, in the frame member 30 of the present embodiment, communication holes 31a are formed in the top face 31 for fixing the bracket 20, and communication holes 32a are formed in the side face 32 extending from the top face 31 downwardly in the Z direction.

As shown in FIG. 8, the lower battery module 10B as a whole is located further below in the Z direction than the first embodiment, and is fixed to the frame member 30, with the outlets 19 being located at the side face 32 of the frame member 30. The outlets 19 of the lower battery module 10B are directly connected with the communication holes 32a of the discharge space S2 formed in the side face 32, without through the bracket 20.

In addition, the bracket 20 in the present embodiment does not include the opening portion 21b as described in the above first embodiment. The passage parts 23 each are constructed to be connected with the opening portion 21a of the fixing portion 21 and the opening portion 22a of the fixing portion 22, and one end of each passage parts 23 is connected with the outlet 19 of the upper battery module 10A via the opening portion 21a, and the other end of each passage parts 23 is connected with the communication hole 31a formed in the top face 31 of the frame member 30.

The gas discharged from the outlets 19 of the battery module 10A flows into the discharge space S2 of the hollow interior of the frame member 30 through the passage parts 23 of the bracket 20. On the other hand, the gas discharged from the outlets 19 of the battery module 10B directly flows into the discharge space S2 of the frame member 30 via the communication holes 32a.

In the present embodiment, since the gas discharged from the upper battery module 10A flows into the discharge space S2 of the frame member 30 via the passage parts 23 of the bracket 20, and the gas discharged from the lower battery module 10B directly flows into the discharge space S2, it is also possible to merge the gas discharged from the respective battery modules 10A, 10B stacked one upon the other and discharge the same to the outside of the vehicle. Since it is unnecessary to separately connect the respective outlets 19 with the outside of the vehicle with respect to the fixing structure of the battery modules 10A, 10B stacked one upon the other, it is possible to reduce the number of the parts and improve the utilization efficiency of the space in the discharge construction for the gas.

In addition, in the present embodiment, since the outlets 19 of the lower battery module 10B are provided to be located at a position of the side face 32 that is further lower than the top face 31 of the frame member 30, it is possible to lower the overall center of gravity of the battery modules 10A, 10B stacked one upon the other with respect to the frame member 30. As shown in FIG. 8, a distance from the top face 31 of the frame member 30 to the center of gravity becomes H1, and is shorter than the distance H shown in FIG. 4 of the above first embodiment. By lowering the overall center of gravity of the battery modules 10A, 10B stacked one upon the other, for example, the moment arm from the frame member 30 to the overall center of gravity of the battery modules 10A, 10B is shortened, and it is possible to achieve lightweight by reducing the thickness of the plate for the bracket 20. In addition, for example, as shown in FIG. 4 and FIG. 8, it is possible to locate the overall center of gravity of the upper and lower battery modules 10A, 10B between the upper battery module 10A and the lower battery module 10B in the Z direction.

In addition, in the example of FIG. 4, a dead space will be formed below the lower battery modules 10B, but in the present embodiment, the outlets 19 of the lower battery module 10B is located lower than the top face 31 of the frame member 30, and the lower battery module 10B is fixed at a position closer to the floor panel P of the vehicle at which the frame member 30 is fixed. Therefore, the dead space below the lower battery module 10B is suppressed from being formed, and it is possible to reduce the height of the on-board power source device 1.

The embodiments of the invention have been described above, and while in the above first and second embodiments, two outlets 19 are provided at each of both end sides in the X direction of the battery module 10, it is not limited to this. For example, the outlets 19 may only be provided at one end side in the X direction, and the gas may be discharged to the outside of the battery modules only from the one end side. In this case, the bracket 20 having passage part 23 may be provided at the one end side of the battery module 10 at which the outlets 19 are located, and at the other end side, an L shaped bracket having no passage part 23 is used to fix the upper and lower battery modules 10A, 10B to the frame member 30. In addition, the frame member 30 for fixing the bracket having no passage part 23 may also be not hollowed.

In addition, while an example in which the module unit includes the battery modules 10A, 10b stacked into two upper and lower layers is described, the module unit may be formed by stacking more battery modules 10 into, for example, three layers, four layers, or more layers. In this case, the fixing portion 21 of the L shaped bracket 20 may be constructed to include a plurality of opening portions corresponding to the respective outlets 19 of the respective layers of battery modules 10, and the respective outlets 19 are connected with the passage part 23.

In addition, as an example of the battery module 10, while an example in which the battery pack is obtained by holding a plurality of cylindrical battery in the holder 12 has been described, but it is not limited to this. For example, it may also be a battery pack obtained by arranging the so-called square battery in the X direction. In this case, for example, passage, pipe, or the like extending in the X direction may be provided to correspond to the discharge valve of the respective square batteries, and the end of the passages or the like extending in the X direction can be set as the outlet 19. Moreover, the bracket 20 having the passage part 23 can be used to fix the respective battery packs stacked one upon another to the frame member 30.

Further, although the battery module 10 in which the holder 12 is arranged at the lower side and the discharge path S3 is arranged at the lower side has been described as an example, it is not limited to this. For example, the holder 12 may be provided at the upper side, and corresponding to the holder 12 provided at the upper side, the discharge path S3 and the outlets 19 may also be provided at the upper side of the battery module 10. In this case, it is also possible to guide the gas to the discharge space S2 of the frame member 30 via the passage part 23 while fixing the upper and lower battery modules 10 to the frame member 30 via the bracket 20.

In addition, as the frame member 30 of the on-board power source device 1 according to the invention, vehicle frames constructing the vehicle, such as cross members, side members, and so on, may be used. These vehicle frames can also be constructed to have a hollow interior to be used as the discharge space S2, and can also be used as a skeleton frame to which the bracket 20 is fixed.

What is claimed is:

1. An on-board power source device for a vehicle, the on-board power device comprising:
   power storage modules stacked one upon another in a predetermined direction, in which a plurality of power storage elements extending in the predetermined direction are arranged side by side in a plane orthogonal to the predetermined direction, the power storage module having a discharge path for discharging gas generated in the power storage elements to the outside of the power storage module through a discharge valve provided at an end side of the power storage elements in the predetermined direction, and an outlet of the discharge path provided at an end portion of the power storage module in an arrangement direction of the plurality of power storage elements;

a frame member that extends along the end portion of upper and lower power storage modules at which the respective outlets are arranged and that fixes the upper and lower power storage modules, the frame member having a hollow interior formed as a discharge space for discharging the gas outside of the vehicle; and a bracket located at the end portion so as to cover the outlets, the bracket fixing the upper power storage module to the frame member, the bracket including a passage part for communicating the outlet of the upper power storage module with the discharge space of the frame member.

2. The on-board power source device according to claim 1, wherein:

the upper and lower power storage modules stacked one upon the other are fixed to the frame member via the bracket;

the passage part extends from the outlet of the upper power storage module downwardly towards the frame member via the outlet of the lower power storage module, and includes a first communication portion communicating with the outlet of the upper power storage module and a second communication portion communicating with the outlet of the lower power storage module; and an end of the passage part that is lower than the second communication portion is connected to a communication hole of the discharge space formed in the frame member.

3. The on-board power source device according to claim 1, wherein:

one end of the passage part is connected to the outlet of the upper power storage module, and the other end of the passage part is connected to a first communication hole of the discharge space formed in a top face of the frame member that is below the upper power storage module; and the lower power storage module is fixed to the frame member with the outlet being located at a side face of the frame member that extends downwardly from the top face, and the outlet is directly connected to a second communication hole of the discharge space formed in the side face.

4. The on-board power storage device according to claim 1, wherein, in the on-board power source device, a plurality of power storage module units each having the power storage modules stacked one upon another are adjacently arranged in a direction in which the frame member extends, the bracket is provided for the adjacent power storage module units, and the bracket is provided with a plurality of said passage parts corresponding to the respective power storage module units.

5. The on-board power storage device according to claim 1, wherein the power storage modules each have:

a holder having a plurality of opening portions respectively for insertion of the plurality of power storage elements and holding an end side of the respective power storage elements;

a first bus bar that is formed with a plurality of first connection portions corresponding to the respective power storage elements arranged in the plane, each of the first connection portions being connected to a first end, which constructs one of end electrodes of the power storage elements at an end side of the power storage elements inserted into the holder and which is provided with the discharge valve, and protruding from a plate shaped base portion extending in the plane towards the first end;

a second bus bar that is formed with a plurality of second connection portions corresponding to the respective power storage elements arranged in the plane, each of the second connection portions being connected to a second end, which constructs another end of the electrodes of the power storage elements at the other end side of the power storage elements; and a cover member for covering the first end of the respective power storage elements arranged in the plane via the first bus bar to form the discharge path for the gas.

6. The on-board power storage device according to claim 2, wherein, in the on-board power source device, a plurality of power storage module units each having the power storage modules stacked one upon another are adjacently arranged in a direction in which the frame member extends, the bracket is provided for the adjacent power storage module units, and the bracket is provided with a plurality of said passage parts corresponding to the respective power storage module units.

7. The on-board power storage device according to claim 3, wherein, in the on-board power source device, a plurality of power storage module units each having the power storage modules stacked one upon another are adjacently arranged in a direction in which the frame member extends, the bracket is provided for the adjacent power storage module units, and the bracket is provided with a plurality of said passage parts corresponding to the respective power storage module units.

8. The on-board power storage device according to claim 6, wherein the power storage modules each have:

a holder having a plurality of opening portions respectively for insertion of the plurality of power storage elements and holding an end side of the respective power storage elements;

a first bus bar that is formed with a plurality of first connection portions corresponding to the respective power storage elements arranged in the plane, each of the first connection portions being connected to a first end, which constructs one end of electrodes of the power storage elements at an end side of the power storage elements inserted into the holder and which is provided with the discharge valve, and protruding from a plate shaped base portion extending in the plane towards the first end;

a second bus bar that is formed with a plurality of second connection portions corresponding to the respective power storage elements arranged in the plane, each of the second connection portions being connected to a second end, which constructs an other end of the electrodes of the power storage elements at the other end side of the power storage elements; and a cover member for covering the first end of the respective power storage elements arranged in the plane via the first bus bar to form the discharge path for the gas.

9. The on-board power storage device according to claim 7, wherein the power storage modules each have:

a holder that has a plurality of opening portions respectively for insertion of the plurality of power storage elements and that holds an end side of the respective power storage elements;

a first bus bar that is formed with a plurality of first connection portions corresponding to the respective power storage elements arranged in the plane, each of the first connection portions being connected to a first end, which constructs one end of electrodes of the power storage elements at an end side of the power storage elements inserted into the holder and which is provided with the discharge valve, and protruding from a plate shaped base portion extending in the plane towards the first end;

a second bus bar that is formed with a plurality of second connection portions corresponding to the respective power storage elements arranged in the plane, each of the second connection portions being connected to a second end, which constructs an other end of the electrodes of the power storage elements at the other end side of the power storage elements; and a cover member for covering the first end of the respective power storage elements arranged in the plane via the first bus bar to form the discharge path for the gas.

* * * * *

UNITED STATES PATENT AND TRADEMARK OFFICE
CERTIFICATE OF CORRECTION

PATENT NO. : 9,941,496 B2
APPLICATION NO. : 14/868863
DATED : April 10, 2018
INVENTOR(S) : Daisuke Murai and Ikkei Ohgitani It is certified that error appears in the above-identified patent and that said Letters Patent is hereby corrected as shown below:

On the Title Page

Column 1, Item (73), Assignees, delete "Kabushiki Kaisha Toyota Jidoshaokki" and insert --Kabushiki Kaisha Toyota Jidoshokki--, therefor.

Signed and Sealed this
Twenty-second Day of May, 2018

Andrei Iancu
*Director of the United States Patent and Trademark Office*